United States Patent Office 3,038,914
Patented June 12, 1962

3,038,914
17-ESTERS OF 6-SUBSTITUTED-11-OXYGENATED-PROGESTERONES
Barney J. Magerlein and Fred Kagan, Kalamazoo, and Carl A. Schlagel, Kalamazoo Township, Kalamazoo County, Mich., assignors to The Upjohn Company, Kalamazoo, Mich., a corporation of Delaware
No Drawing. Filed Mar. 18, 1959, Ser. No. 800,103
11 Claims. (Cl. 260—397.45)

This invention relates to novel steroid esters, more particularly to 17-esters of 17α-hydroxy-unsaturated pregnane-3,20-diones as defined hereinafter.

The novel compounds of this invention can be represented by the following formulae:

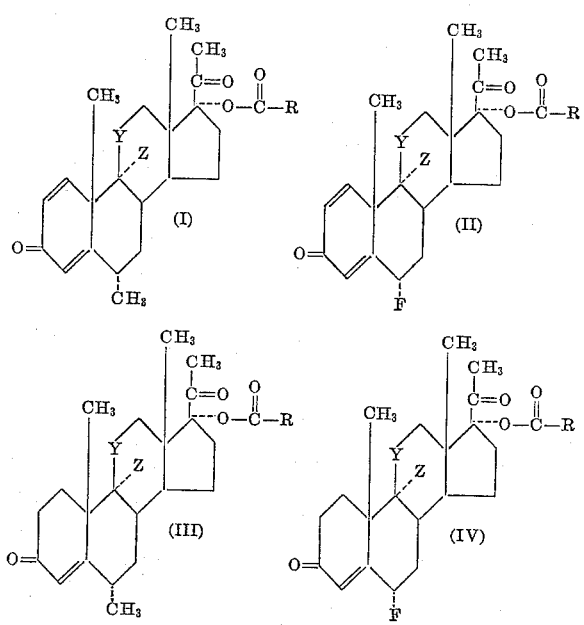

wherein R is selected from the group consisting of hydrogen, a lower-hydrocarbon radical, i.e., containing from one to eight carbon atoms, inclusive; ω-carboxy-lower-hydrocarbon, i.e., containing from one to eight carbon atoms, inclusive, including metal salts thereof, disubstituted-amino-methylene radicals, including salts thereof; Y is β-hydroxymethylene or carbonyl; and Z is hydrogen, fluorine, chlorine or bromine.

The compounds of this invention possess high anti-inflammatory activity, as well as possessing other activities not normally associated with compounds of this type, e.g., diuretic with potassium excretion and progestational activity. Moreover, the claimed compounds possess fewer of the adrenocorticoid side effects normally associated with compounds possessing anti-inflammatory activity. For example, the 17-acetate represented by Formula I wherein R is methyl, Y is β-HOCH and Z is fluorine possesses 200 times the anti-inflammatory activity of hydrocortisone subcutaneously in the granuloma pouch test and is much more active than hydrocortisone in cases of contact dermatitis, yet possesses less than 5% the mineralocorticoid activity of desoxycorticosterone acetate and a much higher ratio of anti-inflammatory activity to ACTH inhibition and thymic involution activity than hydrocortisone.

The compounds of this invention are particularly useful as anti-inflammatory agents, e.g., in cases of inflammatory conditions of the skin, eyes, bones and respiratory tract or other internal organs due to bacterial and viral infections or to allergic reactions, e.g., contact dermatitis, or other inflammatory conditions resulting from physiological maladjustment.

The compounds of this invention can be administered to the animal organism in the usual fashion, e.g., orally, topically or parenterally. For this purpose they can be incorporated in pharmaceutical solutions or suspensions, e.g., aqueous solutions, particularly when R is ω-carboxyalkyl alkali-metal salt, or aqueous suspensions, in lotions, cremes, ointments, salves, jellies, or in tablet, powder, pill or capsule form.

Advantageously but not necessarily the compounds of this invention can be combined with an antibiotic to suppress the bacterial infections which often accompany inflammatory conditions. Examples of such antibiotics are the penicillins, neomycin, tetracycline, chloromycetin, bacitracin, novobiocin, erythromycin, polymyxin B sulfate, gramicidin, streptomycin sulfate, dihydrostreptomycin and chloroamphenicol. Alternatively or additionally, one of the sulfonamides can be incorporated.

A dermatological and ophthalmic ointment can, for example, have the following composition:

| | Lbs. |
|---|---|
| Wool fat, U.S.P. | 100 |
| Mineral oil, U.S.P. | 125 |
| 6α-methyl - 9α - fluoro-11β,17α-dihydroxy-1,4-pregnadiene-3,20-dione 17-acetate | 0.1–1 |
| White petrolatum, U.S.P. | 500 |

The exact amount of steroid employed will depend in part upon the particular compound chosen. 3 lbs. of neomycin sulfate can advantageously be incorporated in the the above formula.

The compounds of this invention are prepared by esterifying the corresponding 17-hydroxy steroid, e.g., with the anhydride of the selected acid or with formic acid, in a manner known in the art for esterifying difficultly esterifiable hydroxy steroids. This esterification can readily be accomplished by heating the starting steroid with the selected anhydride in the presence of an acid catalyst, e.g., p-toluenesulfonic acid. Short heating will not appreciably affect the 3-keto group of a starting $\Delta^{1,4}$-steroid. However, when esterifying a $\Delta^4$-steroid or upon prolonged heating of a $\Delta^{1,4}$-steroid, the 3-keto group is concomitantly converted to an enol ester group. However, this group is readily reconverted to a 3-keto group by mild treatment with base, e.g., heating with dilute aqueous sodium or potassium bicarbonate, while at the same time leaving the 17-acylate group unaffected.

The compounds of this invention (I–IV) wherein Y is carbonyl can be prepared from the corresponding compounds wherein Y is β-hydroxymethylene (preferably wherein R is hydrocarbon) by oxidation of the latter compounds with chromic acid in acetic acid according to techniques known in the art.

The compounds of this invention (I–IV) wherein Z is fluorine can be prepared from the corresponding compounds wherein Z is hydrogen and Y is β-hydroxymethylene (preferably wherein R is hydrocarbon) by dehydration of the β-hydroxy group, e.g., via the corresponding p-toluenesulfonate or with anhydrous sulfur dioxide and N-bromoacetamide, to produce the corresponding $\Delta^{9(11)}$-compound which is then reacted with N-bromoacetamide or N-chlorosuccinimide in the presence of aqueous perchloric acid to produce the corresponding 9α-chloro-11β-hydroxy and 9α-bromo-11β-hydroxy compounds. These compounds are converted with potassium acetate or sodium which are then converted with anhydrous or aqueous hydrogen fluoride to the corresponding 9α-fluoro-11β-hydroxy compounds.

The aminoesters of this invention (I–IV, R=disubstituted aminomethylene, i.e.,

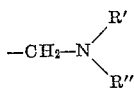

wherein R' and R" are alike or different and are lower-alkyl, e.g., methyl, ethyl, propyl, butyl, amyl, hexyl, heptyl, octyl, or together with the amino nitrogen atom form a ring, e.g., pyrrolidino, piperidino, morpholino, hexamethyleneimino) are prepared by converting the starting 17-hydroxy compound to a 17-bromoacetate ester thereof by reaction with bromoacetic anhydride. This bromoester is then reacted with the selected secondary amine to produce the corresponding 17-disubstituted aminoacetate ester.

The acid addition salts of the above-described aminoesters are prepared in the usual manner, e.g., by reaction of the free base with the selected acid, preferably under anhydrous conditions. Preferred acid addition salts are the pharmacologically acceptable salts, e.g., formate, acetate, propionate, sulfate, phosphate, nitrate, citrate, tartrate, lactate, etc.

The quaternary ammonium salts of the above-described aminoesters are prepared in the usual manner by alkylating the free base with the selected alkyl halide, e.g., lower-alkyl bromide or iodide, preferably methyl or ethyl bromide or iodide.

The compounds of this invention (I–V) wherein R is lower-hydrocarbon-COOH are prepared in the usual manner, preferably by reaction with the selected cyclic acid anhydride, e.g., succinic anhydride, alkyl substituted succinic anhydride, glutaric anhydride, alkyl substituted glutaric anhydride, etc. The resulting ω-carboxylalkyl acid ester can be converted to metal salts thereof, e.g., alkali-metal, to produce a water soluble product.

The following examples are illustrative of the process and products of the present invention, but are not to be construed as limiting.

EXAMPLE 1

*6α-Methyl-9α-Fluoro-11β,17α-Dihydroxy-1,4-Pregnadiene-3,20-Dione 17-Acetate*

A solution of 2.0 g. of 6α-methyl-9α-fluoro-11β,17α-dihydroxy-1,4-pregnadiene-3,20-dione, 5 ml. of distilled acetic anhydride, 500 mg. of p-toluenesulfonic acid and 5 ml. of acetic acid was heated at 75° under a stream of nitrogen for 3 minutes. The heat was removed and the mixture was stirred for 30 minutes. The mixture was poured with vigorous stirring into 500 ml. of water. The precipitated solid was separated by filtration, dried and the 2 g. of 6α-methyl-9α-fluoro-11β,17α-dihydroxy-1,4-pregnadiene-3,20-dione 17-acetate thus obtained was recrystallized from ethyl acetate to give crystals melting at 224 to 226° C. Addition of hexanes to the filtrate gave additional product melting at 221 to 224° C. Several recrystallizations from a mixture of ethyl acetate and hexanes gave an analytically pure sample melting at 230 to 232° C. having an $[\alpha]_D$ of +28° (CHCl$_3$) and the analysis below.

*Analysis.*—Calculated for C$_{24}$H$_{31}$FO$_5$: C, 68.99; H, 7.47; F, 4.54. Found: C, 68.90; H, 7.56; F, 4.7.

Substituting another lower-hydrocarbon carboxylic acid anhydride for the acetic anhydride is productive of other 6α-methyl-9α-fluoro-11β,17α-dihydroxy-1,4-pregnadiene-3,20-dione 17-acylates wherein the acyl radical of the acylate group is the acyl radical of, for example, a lower-aliphatic acid, e.g., formic (formic acid plus acetic anhydride), propionic, butyric, isobutyric, valeric, isovaleric, trimethylacetic, 2-methylbutyric, 3-ethylbutyric, hexanoic, diethylacetic, triethylacetic, heptanoic, octanoic, α-ethylisovaleric, a cyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., benzoic, methylbenzoic, dimethylbenzoic, ethylbenzoic, trimethylbenzoic, α-naphthoic, 3-methyl-α-naphthoic, an aralkyl acid, e.g., phenylacetic, phenylpropionic, diphenylacetic, triphenylacetic, a dibasic acid (which can be converted to water soluble, e.g., sodium salts), e.g., succinic, glutaric, α-methylglutaric, β-methylglutaric, β,β-dimethylglutaric, adipic, pimelic, and suberic acid.

EXAMPLE 2

*6α-Methyl-9α-Fluoro-11β,17α-Dihydroxy-1,4-Pregnadiene-3,20-Dione 17-Diethylaminoacetate*

A mixture of 1.0 g. of 6α-methyl-9α-fluoro-11β,17α-dihydroxy-1,4-pregnadiene-3,20-dione, 2 ml. of bromoacetic acid, 2 ml. of bromoacetic anhydride, and 250 mg. of p-toluenesulfonic acid was heated to about 75° for about 5 minutes under a stream of nitrogen until solution was complete. Then the solution was permitted to cool to room temperature. The cool mixture was poured into 200 ml. of water with vigorous stirring. The precipitated product was filtered, dried and recrystallized from a mixture of ethyl acetate and hexane hydrocarbons to give substantially pure 6α-methyl-9α-fluoro-11β,17α-dihydroxy-1,4-pregnadiene-3,20-dione 17-bromoacetate.

100 mg. of the thus produced 6α-methyl-9α-fluoro-11β, 17α-dihydroxy-1,4-pregnadiene-3,20-dione 17-bromoacetate was dissolved in 20 ml. of benzene and to the solution was added a solution of a 10% molar excess of diethylamine in 20 ml. of benzene. The mixture was stirred for 1 hour at 26° C. and then warmed for 1 hour. The reaction mixture was concentrated almost to dryness at reduced pressure and then was extracted with ice water containing a small amount of hydrochloric acid. The aqueous solution was extracted thoroughly with ether and then made slightly alkaline with cold 1 N sodium hydroxide and extracted thoroughly with ether. The extracts containing the 6α-methyl-9α-fluoro-11β,17α-dihydroxy-1,4-pregnadiene-3,20-dione 17-diethylaminoacetate were dried with sodium sulfate and then made slightly acidic with anhydrous hydrogen chloride. The mixture was filtered to give 6α-methyl-9α-fluoro-11β,17α-dihydroxy-1,4-pregnadiene-3,20-dione 17-diethylaminoacetate hydrochloride.

Alternatively, the 17-bromoacetate ester can be treated with sodium iodide in acetone to produce the corresponding 17-iodoacetate which is then treated with diethylamine in the same manner as described above.

Following the procedure of Example 2 exactly, but substituting dimethylamine for the diethylamine, there is thus produced 6α-methyl-9α-fluoro-11β,17α-dihydroxy-1,4-pregnadiene-3,20-dione 17-dimethylaminoacetate and its hydrochloride. Similarly, substituting other di-lower-alkylamines, wherein the alkyl groups are the same or different, e.g., propyl, butyl, amyl, hexyl, heptyl, octyl, there is thus produced other 6α-methyl-9α-fluoro-11β,17α-dihydroxy-1,4-pregnadiene-3,20-dione 17-dialkylaminoacetates and their hydrochlorides. Substituting another acid for the hydrogen chloride employed in the above-described process is productive of other acid addition salts, e.g., hydrobromide, phosphate, sulfate, acetate, citrate, lactate, etc.

Similarly, 6α-methyl-11β,17α-dihydroxy-1,4-pregnadiene-3,20-dione, 6α-methyl-17α-hydroxy-1,4-pregnadiene-3,11,20-trione, 6α-methyl-9α-fluoro-17α-hydroxy-1,4-pregnadiene-3,11,20-trione, 6α,9α-difluoro-11β,17α-dihydroxy-1,4-pregnadiene-3,20-dione, 6α,9α-difluoro-17α-hydroxy-1,4-pregnadiene-3,11,20-trione, 6α-fluoro-17α-hydroxy-1,4-pregnadiene-3,11,20-trione, and 6α-fluoro-11β,17α-dihydroxy-1,4-pregnadiene-3,20-dione are converted with diethylamine according to the method of Example 2 to 6α-methyl-11β,17α-dihydroxy-1,4-pregnadiene-3,20-dione 17-diethylaminoacetate, 6α-methyl-17α-hydroxy-1,4-pregnadiene-3,11,20-trione 17-diethylaminoacetate, 6α-methyl-9α-fluoro-17α-hydroxy-1,4-pregnadiene-3,11,20-trione 17-diethylaminoacetate, 6α,9α-difluoro-11β,17α-dihydroxy- 1,4-pregnadiene-3,20-dione 17-diethylaminoacetate, 6α,9α-difluoro-17α-hydroxy-1,4-pregnadiene-3,11,20-trione 17-diethylaminoacetate, 6α-fluoro-17α-hydroxy-1,4-pregnadiene-3,11,20-trione 17-diethylaminoacetate, and 6α-fluoro-11β,17α-dihydroxy-1,4-pregnadiene-3,20-dione 17-diethylaminoacetate, and their hydrochlorides, respectively.

Following the procedure of Example 2 exactly, but substituting dimethylamine (in a sealed tube), methylethylamine, dipropylamine, methylpropylamine, ethylpropylamine, pyrrolidine, 2-methylpyrrolidine, piperidine, morpholine, methylbenzylamine, ethylbenzylamine, or dibenzylamine for the diethylamine, there is thus produced the corresponding 17-tertiaryaminoacetate of 6α-methyl-9α-fluoro-11β,17α-dihydroxy-1,4-pregnadiene-3,20-dione.

25 mg. of 6α-methyl-9α-fluoro-11β,17α-dihydroxy-1,4-pregnadiene-3,20-dione 17-diethylaminoacetate was dissolved in 25 ml. of cold benzene. The solution was chilled and to it was added 0.5 ml. of methyl bromide. The flask was sealed and maintained at room temperature for 48 hours. The resulting mixture was made slightly alkaline with ice cold dilute sodium hydroxide. The benzene layer was separated and the aqueous layer was made slightly acidic with dilute hydrochloric acid and then evaporated to dryness at room temperature and reduced pressure. The residue was extracted thoroughly with acetone. The acetone extracts were dried, evaporated almost to dryness and then diluted with ethylacetate. There was thus precipitated 6α-methyl-9α-fluoro-11β,17α-dihydroxy-1,4-pregnadiene-3,20-dione 17-diethylaminoacetate methobromide.

EXAMPLE 3

*6α-Methyl-9-α-Fluoro-11β,17α-Dihydroxy-1,4-Pregnadiene-3,20-Dione 17-Triethylaminoacetate Ethobromide*

100 mg. of 6α-methyl-9α-fluoro-11β,17α-dihydroxy-1,4-pregnadiene-3,20-dione 17-bromoacetate was dissolved in 20 ml. of benzene and to the solution was added a solution of a 50% molar excess of triethylamine in 20 ml. of benzene. The mixture was heated under reflux for 2 hours and then poured onto ice. The aqueous phase was extracted thoroughly with methylene chloride and then concentrated to dryness at reduced pressure at below 50° C. The residue consisted essentially of 6α-methyl-9α-fluoro-11β,17α-dihydroxy-1,4-pregnadiene-3,20-dione 17-triethylaminoacetate ethobromide.

EXAMPLE 4

*6α,9α-Difluoro-11β,17α-Dihydroxy-1,4-Pregnadiene-3,20-Dione 17-Acetate*

Following the procedure of Example 1 exactly, but substituting 6α,9α-difluoro-11β,17α-dihydroxy-1,4-pregnadiene-3,20-dione as the starting steroid, there was thus produced 6α,9α-difluoro-11β,17α-dihydroxy-1,4-pregnadiene-3,20-dione 17-acetate.

Similarly, 6α-methyl-11β,17α-dihydroxy-1,4-pregnadiene-3,20-dione, 6α-methyl-17α-hydroxy-1,4-pregnadiene-3,11,20-trione, 6α-methyl-9α-fluoro-17α-hydroxy-1,4-pregnadiene-3,11,20-trione, 6α-fluoro-11β,17α-dihydroxy-1,4-pregnadiene-3,20-dione, 6α-fluoro-17α-hydroxy-1,4-pregnadiene-3,11,20-trione, and 6α,9α-difluoro-17α-hydroxy-1,4-pregnadiene-3,11,20-trione were converted, according to the method described in Example 1, to 6α-methyl-11β,17α-dihydroxy-1,4-pregnadiene-3,20-dione 17-acetate, 6α-methyl-17α-hydroxy-1,4-pregnadiene-3,11,20-trione 17-acetate, 6α-methyl-9α-fluoro-17α-hydroxy-1,4-pregnadiene-3,11,20-trione 17-acetate, 6α-fluoro-11β,17α-dihydroxy-1,4-pregnadiene-3,20-dione 17-acetate, 6α-fluoro-17α-hydroxy-1,4-pregnadiene-3,11,20-trione 17-acetate, and 6α,9α-difluoro-17α-hydroxy-1,4-pregnadiene-3,11,20-trione 17-acetate, respectively.

Other 17-acylates of the above-described compounds, e.g., wherein the acyl radical is that of an acid named in the paragraph following Example 1, are prepared by substituting another lower-hydrocarbon carboxylic acid anhydride for the acetic anhydride.

EXAMPLE 5

*6α-Methyl-9α-Fluoro-11β,17α-Dihydroxy-4-Pregnene-3,20-Dione 17-Diethylaminoacetate Hydrochloride*

Following the procedure of Example 2 exactly, 6α-methyl-9α-fluoro-11β-17α-dihydroxy - 4 - pregnene-3,20-dione was esterified with bromoacetic anhydride and the esterification product was isolated according to the method of Example 2. The reaction mixture was then treated with diethylamine and the reaction product isolated according to the method described in Example 2. The isolated product was taken up in 50 ml. of methanol and then refluxed for 5 minutes with 5 ml. of 10% aqueous sodium bicarbonate. The mixture was evaporated to dryness at reduced pressure and the residue extracted thoroughly with benzene. The benzene was dried and then made slightly acidic with anhydrous hydrogen chloride. There was thus obtained a precipitate of 6α-methyl-9α-fluoro-11β,17α-dihydroxy-4-pregnene-3,20-dione 17-diethylaminoacetate hydrochloride which was filtered and dried.

Similarly,

6α-methyl-11β,17α-dihydroxy-4-pregnene-3,20-dione,
6α-methyl-17α-hydroxy-4-pregnene-3,11,20-trione,
6α-methyl-9α-fluoro-17α-hydroxy-4-pregnene-3,11,20-trione,
6α-fluoro-11β,17α-dihydroxy-4-pregnene-3,20-dione,
6α-fluoro-17α-hydroxy-4-pregnene-3,11,20-trione,
6α,9α - difluoro - 11β,17α - dihydroxy - 4 - pregnene-3,20-dione, and
6α,9α-difluoro-17α-hydroxy-4-pregnene-3,11,20-trione are converted with diethylamine according to the method of Example 4 to 6α-methyl-11β,17α-dihydroxy-4-pregnene-3,20-dione 17-diethylaminoacetate,
6α-methyl-17α-hydroxy-4-pregnene-3,11,20-trione 17-diethylaminoacetate,
6α-methyl-9α-fluoro-17α-hydroxy-4-pregnene-3,11,20-trione 17-diethylaminoacetate,
6α-fluoro-11β,17α-dihydroxy-4-pregnene-3,20-dione 17-diethylaminoacetate,
6α-fluoro-17α-hydroxy-4-pregnene-3,11,20-trione 17-diethylaminoacetate,
6α,9α - difluoro - 11β,17α - dihydroxy - 4 - pregnene-3,20-dione 17-diethylaminoacetate,
6α,9α - difluoro - 11β,17α - dihydroxy - 4 - pregnene-3,20-dione 17-diethylaminoacetate, and
6α,9α-difluoro-17α-hydroxy-4-pregnene-3,11,20-trione 17-diethylaminoacetate and their hydrochlorides, respectively.

EXAMPLE 6

*6α-Methyl-9α-Fluoro-11β,17α-Dihydroxy-4-Pregnene-3,20-Dione 17-Acetate*

Following the procedure of Example 1, 2.0 g. of 6α-methyl - 9α - fluoro - 11β,17α - dihydroxy - 4 - pregnene-3,20-dione was reacted with 7 ml. of acetic anhydride, 500 mg. of p-toluenesulfonic acid and 7 ml. of glacial acetic acid. The solid which precipitated upon the addition of water was separated, dissolved in 50 ml. of methanol. To the solution was added 20 ml. of 10% aqueous potassium bicarbonate. The mixture was refluxed for 1 hour. The methanol was then distilled under reduced pressure. The precipitated steroid was filtered, washed with water and dried to give 6α-methyl-9α-fluoro - 11β,17α - dihydroxy - 4 - pregnene - 3,20 - dione 17-acetate.

Substituting another lower-hydrocarbon carboxylic acid anhydride for the acetic anhydride is productive of other 17-acylates 6α-methyl-9α-fluoro-11β,17α-dihydroxy-4-pregnene-3,20-dione, e.g., wherein the acyl radical is that of an acid named in the paragraph following Example 1.

EXAMPLE 7

*6α,9α-Difluoro-11β,17α-Dihydroxy-4-Pregnene-3,20-Dione 17-Acetate*

Following the procedure of Example 6, 6α,9α-difluoro-11β,17α-dihydroxy-4-pregnene-3,20-dione was converted to 6α,9α-difluoro-11β,17α-dihydroxy-4-pregnene-3,20-dione 17-acetate.

Substituting another lower-hydrocarbon carboxylic acid anhydride for the acetic anhydride is productive of other 17-acylates of 6α,9α-difluoro-11β,17α-dihydroxy-4-pregnene-3,20-dione, e.g., wherein the acyl radical is that of an acid named in the paragraph following Example 1.

Similarly,

6α-methyl-9α-fluoro-17α-hydroxy-4-pregnene-3,11,20-trione,
6α-methyl-17α-hydroxy-4-pregnene-3,11,20-trione,
6α-methyl-11β,17α-dihydroxy-4-pregnene-3,20-dione,
6α-fluoro-11β,17α-dihydroxy-4-pregnene-3,20 dione,
6α-fluoro-17α-hydroxy-4-pregnene-3,11,20-trione, and
6α,9α-difluoro-17α-hydroxy-4-pregnene-3,11,20-trione were converted to 6α-methyl-9α-fluoro-17α-hydroxy-4-pregnene-3,11,20-trione 17-acetate,
6α-methyl-17α-hydroxy-4-pregnene-3,11,20-trione 17-acetate,
6α-methyl-11β,17α-dihydroxy-4-pregnene-3,20-dione 17-acetate,
6α-fluoro-11β,17α-dihydroxy-4-pregnene-3,20-dione 17-acetate,
6α-fluoro-17α-hydroxy-4-pregnene-3,11,20-trione 17-acetate, and
6α,9α-difluoro-17α-hydroxy-4-pregnene-3,11,20-trione 17-acetate, respectively.

We claim:

1. A compound of the formula:

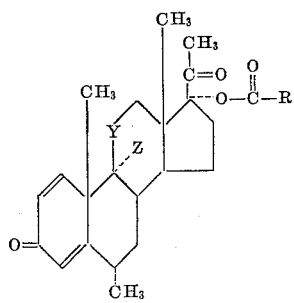

wherein R is selected from the group consisting of hydrogen, lower-alkyl containing from 1 to 8 carbon atoms, inclusive, ω-carboxy-lower-hydrocarbon and alkali-metal salts thereof, and disubstituted-aminomethylene radicals selected from the group consisting of di-lower-alkyl-aminomethylene, lower-alkylbenzylaminomethylene, dibenzylaminomethylene, pyrrolidinomethylene, piperidinomethylene, and morpholinomethylene and acid addition and quaternary ammonium salts thereof; Y is selected from the group consisting of β-hydroxymethylene and carbonyl; and Z is selected from the group consisting of hydrogen, fluorine, chlorine and bromine.

2. 6α-methyl-9α-fluoro-11β,17α-dihydroxy-1,4-pregnadiene-3,20-dione 17-lower-alkylacylate.

3. 6α-methyl-9α-fluoro-11β,17α-dihydroxy-1,4-pregnadiene-3,20-dione 17-acetate.

4. 6α-methyl-9α-fluoro-11β,17α-dihydroxy-1,4-pregnadiene-3,20-dione 17-di-lower-alkylaminoacetate hydrochloride.

5. 6α-methyl-9α-fluoro-11β,17α-dihydroxy-1,4-pregnadiene-3,20-dione 17-diethylaminoacetate hydrochloride.

6. A compound of the formula:

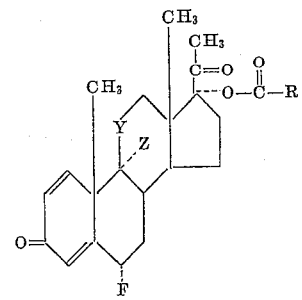

wherein R is selected from the group consisting of hydrogen, lower-alkyl containing from 1 to 8 carbon atoms, ω-carboxy-lower-hydrocarbon and alkali-metal salts thereof, inclusive, and disubstituted-aminomethylene radicals selected from the group consisting of di-lower-alkyl-aminomethylene, lower-alkylbenzylaminomethylene, dibenzylaminomethylene, pyrrolidinomethylene, piperidinomethylene, and morpholinomethylene and acid addition and quaternary ammonium salts thereof; Y is selected from the group consisting of β-hydroxymethylene and carbonyl; and Z is selected from the group consisting of hydrogen, fluorine, chlorine and bromine.

7. 6α,9α-difluoro-11β,17α-dihydroxy-1,4-pregnadiene-3,20-dione 17-lower-alkylacylate.

8. 6α,9α-difluoro-11β,17α-dihydroxy-1,4-pregnadiene-3,20-dione 17-acetate.

9. A compound of the formula:

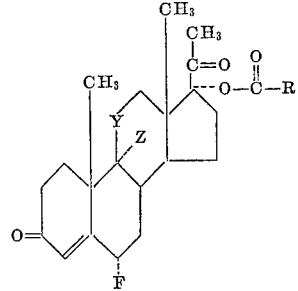

wherein R is selected from the group consisting of hydrogen, lower-alkyl containing from 1 to 8 carbon atoms, inclusive, ω-carboxy-lower-hydrocarbon and alkali-metal salts thereof, and disubstituted-aminomethylene radicals selected from the group consisting of di-lower-alkylaminomethylene, lower-alkylbenzylaminomethylene, dibenzylaminomethylene, pyyrolidinomethylene, piperidinomethylene, and morpholinomethylene and acid addition and quaternary ammonium salts thereof; Y is selected from the group consisting of β-hydroxymethylene and carbonyl; and Z is selected from the group consisting of hydrogen, fluorine, chlorine and bromine.

10. 6α,9α-difluoro-11β,17α-dihydroxy-4-pregnene-3,20-dione 17-lower-alkylacylate.

11. 6α,9α-difluoro-11β,17α-dihydroxy-4-pregnene-3,20-dione 17-acetate.

References Cited in the file of this patent

UNITED STATES PATENTS

| | | |
|---|---|---|
| 2,837,464 | Nobile | June 3, 1958 |
| 2,838,496 | Babcock et al. | June 10, 1958 |
| 2,838,536 | Magerlein et al. | June 10, 1958 |
| 2,838,538 | Spero et al. | June 10, 1958 |
| 2,867,637 | Lincoln et al. | Jan. 6, 1959 |
| 2,867,638 | Lincoln et al. | Jan. 6, 1959 |
| 2,875,200 | Hogg et al. | Feb. 24, 1959 |
| 2,892,851 | Bergstrom et al. | June 30, 1959 |